Figure 1:
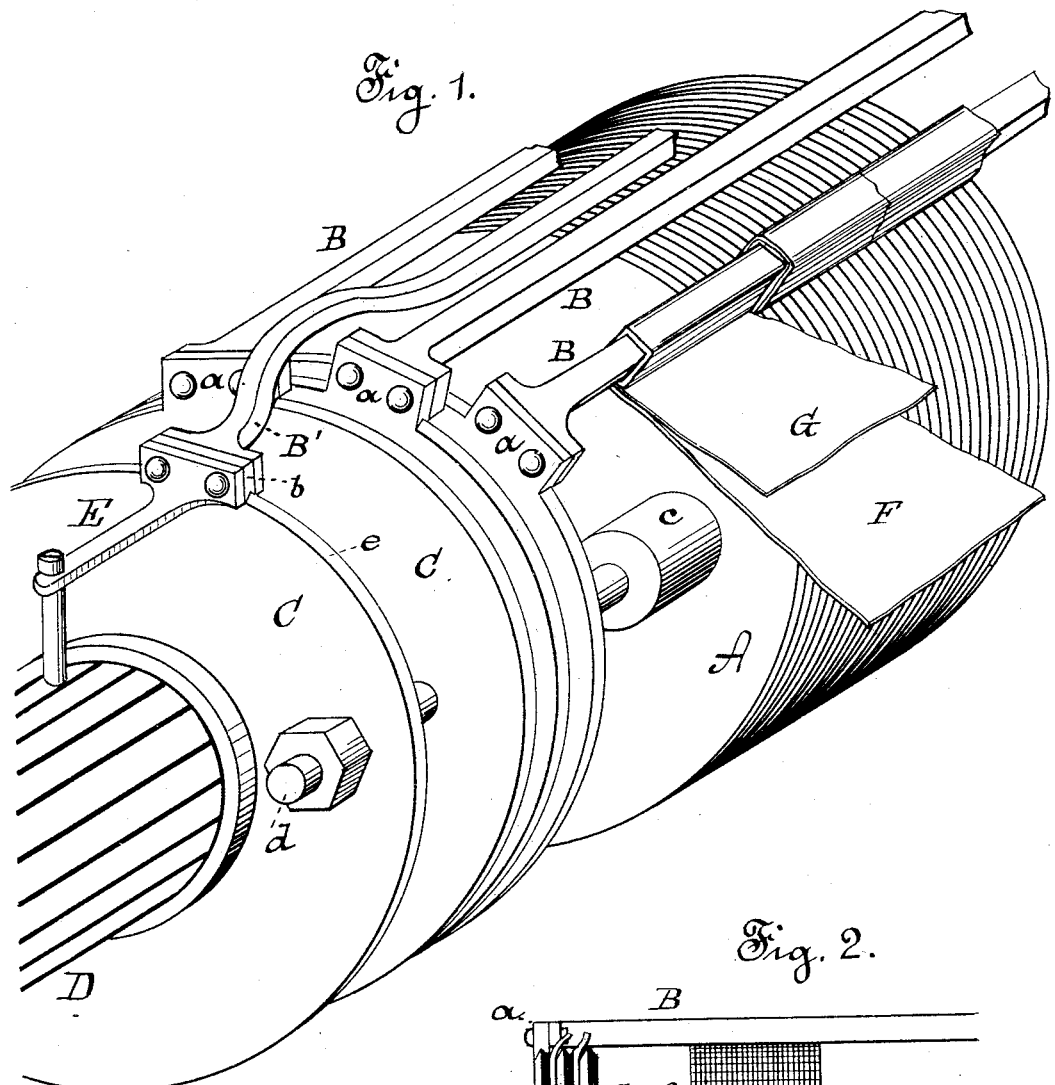

(No Model.)  2 Sheets—Sheet 1.

T. A. EDISON.
DYNAMO OR MAGNETO ELECTRIC MACHINE.

No. 264,647. Patented Sept. 19, 1882.

WITNESSES:
O. D. Mott
M. J. Clagett

INVENTOR:
T. A. Edison
BY Dyer & Wilber
ATTORNEYS

N. PETERS. Photo-Lithographer, Washington, D. C.

(No Model.) 2 Sheets—Sheet 2.

T. A. EDISON.
DYNAMO OR MAGNETO ELECTRIC MACHINE.

No. 264,647. Patented Sept. 19, 1882.

WITNESSES:
E. C. Rowland
N. A. Clark

INVENTOR:
Thomas A. Edison
By Rich'd N. Dyer
Atty.

UNITED STATES PATENT OFFICE.

THOMAS A. EDISON, OF MENLO PARK, NEW JERSEY, ASSIGNOR TO THE EDISON ELECTRIC LIGHT COMPANY, OF NEW YORK, N. Y.

DYNAMO OR MAGNETO ELECTRIC MACHINE.

SPECIFICATION forming part of Letters Patent No. 264,647, dated September 19, 1882.

Application filed October 4, 1881. (No model.)

*To all whom it may concern:*

Be it known that I, THOMAS A. EDISON, of Menlo Park, in the county of Middlesex and State of New Jersey, have invented a new and useful Improvement in Dynamo or Magneto Electric Machines, (Case No. 347;) and I do hereby declare that the following is a full and exact description of the same, reference being had to the accompanying drawings, and to the letters of reference marked thereon.

The object I have in view is to produce such improvements upon my dynamo or magneto electric machine wherein are employed inductive bars running lengthwise of the armature and connected at their ends by disks that a better connection between the ends of the bars and the disks will be formed, so as to prevent heating at those points; the connections between the disks and the commutator-bars will have a larger conducting area and be more rigid than in constructions previously employed by me, in order to prevent the heating of such connections, and also to prevent their breakage by abrasion; the contacts of bars and rods with disks will be reduced in resistance and prevented from oxidizing; the copper disks for connecting the ends of the bars will be located outside of the field of force, or nearly so, and will not be heated by the circulation of currents induced in them when the circuit is open at the commutator by movement in the magnetic field; means will be provided for preventing electrical creeping between the edges of the copper disks; and, finally, the copper inductive bars will be so insulated that the insulation cannot be pierced by electricity, and at the same time the heat will be conducted off and not allowed to accumulate in the bars.

In my dynamo or magneto electric machines the copper bars are connected at their ends to bars or lugs on copper disks insulated from each other, which bars are arranged in a spiral line extending twice, or nearly so, around the circumference of the cylinder formed by the disks at each end of the armature. Heretofore I have made these ears of the same size as the unenlarged ends of the copper bars and have separated them the width of the bar, every alternate bar passing between two ears of the first line to an ear of the second line. By my present invention these ears are widened so as to close up the spaces between them, and the copper bars are provided with T-shaped ends, which are secured to said ears. The alternate bars are curved outwardly so as to pass over the first line of ears, and inwardly again to make connection with ears of the second line. This construction provides a larger contact between the bars and disks. To lessen the resistance of this contact and prevent oxidation I plate the surfaces with gold or silver, or amalgamate them with mercury; or I may first plate with silver and then amalgamate the surfaces. It is desirable to do this because the resistance of a contact between two copper surfaces is very great to begin with, and as such surfaces are very liable to oxidation such resistance will continually become greater. A gold, silver, or mercury contact, however, is one of low resistance, oxidizes less rapidly, and is less susceptible to outside influences, gold being especially preferable for these reasons to the other metals mentioned. In addition, to give strength and a large conducting area, I use washers, which are placed on the outside of the ears, and are secured by the same bolts that pass through the ears and the ends of bars. The broadened or T-shaped bars could also be used in the armature shown in my Patent No. 242,898, of June 14, 1881, in which the ends of the bars are secured in notches at the ends of radial plates, or in other armatures having connecting-plates, the term "plate" being intended to include both entire disks and segmental or radial plates.

For commutator-connections I dispense with the tongues heretofore used by me, and extending from the open centers of disks to the commutator-bars, and employ instead thereof exterior rods, which have the same, or nearly the same, conducting area as the inductive bars. These rods have T-shaped ends, and are secured to alternate ears of the disks by the same bolts that secure the inductive bars thereto. This gives one commutator-connection for each disk of great strength and low resistance. The rods that are secured to ears of the inner line are curved outwardly to avoid the ears of the second line. The surface-contacts of these rods and the ears are also plated with gold or silver or amalgamated, or plated with silver and then amalgamated.

To secure the benefits of locating the copper disks outside of the field of force, or nearly so, I place thimbles upon the bolts which secure the disks to the armature-core, which thimbles are situated between the core and disks and separate the disks a certain distance from the core. Since the polar extensions of the exciting magnet or magnets terminate at the ends of the armature-core, the copper disks will be wholly outside of such polar extensions, and consequently outside of the magnetic field, or nearly so. An air-space is also formed between each end of the armature-core and the disks by this construction, through which space air circulates and serves to conduct off heat generated in the parts.

To prevent electrical creeping between the edges of the copper disks, such disks are beveled on both sides at their edges, and the paper sheets which are used to insulate the copper disks from each other are extended a short distance beyond the edges of the disks, and are pressed down into the angular spaces formed by the beveled edges.

For insulating the copper inductive bars I wrap them with parchment-paper. The parchment-paper I find is not only a good insulator, but is also a good conductor of heat, on account of its compactness, and is tough and durable and otherwise well adapted for the purpose. Ordinary paper or other fibrous material having its pores filled with a sizing or varnish, so as to be a fair conductor of heat, I consider the equivalent of the parchment-paper. I prefer to use in connection with the wrapping of parchment-paper a layer of mica, which is wrapped with the parchment-paper, being held by the same and prevented from breaking into pieces and falling from place. Mica is also a good conductor of heat, as well as being a good insulator of electricity, and forms with the holding wrapping of parchment-paper an exceedingly efficient heat-conducting insulation for the inductive bars, although the parchment-paper may be used without the mica. The bars may also be japanned or covered with rubber, which is afterward vulcanized.

Figure 2:
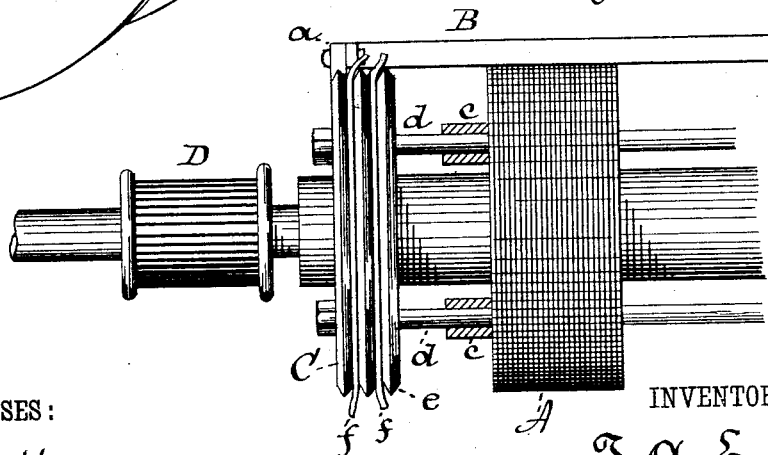

The foregoing will be better understood by reference to the drawings, in which Figure 1 is a perspective view from the commutator end of my machine, showing a few of the parts separated for clear illustration; Fig. 2, a side elevation of some of the parts at the commutator end of the armature; and Fig. 3, a side elevation of the main parts of the machine, the bars being removed from the armature.

A is the core of the armature.

B B' are the copper inductive bars, extending longitudinally along the core A, and connected at their ends to copper disks C, insulated from each other. The bars B extend straight to the ears $a$ of the disks, while the alternate bars B' are curved over the first line of ears to ears $b$ of the second line.

D is the commutator, and E represents the rods, extending from alternate ears to the bars of the commutator. The contacts of B and B' and of E with the ears of disks C are plated or amalgamated, or both, as before described.

The thimbles $c$ on bolts $d$ separate the disks C from the ends of the core A to bring such disks outside of the polar extensions of the machine and remove them as far as practical from the effects of the magnetic field. The copper disks C have double-beveled edges $e$, forming angular spaces, into which the projecting edges of paper sheets $f$ are pressed to prevent electrical creeping between the edges of disks.

F is the insulating wrapping of parchment-paper, and G the mica.

Figure 3:
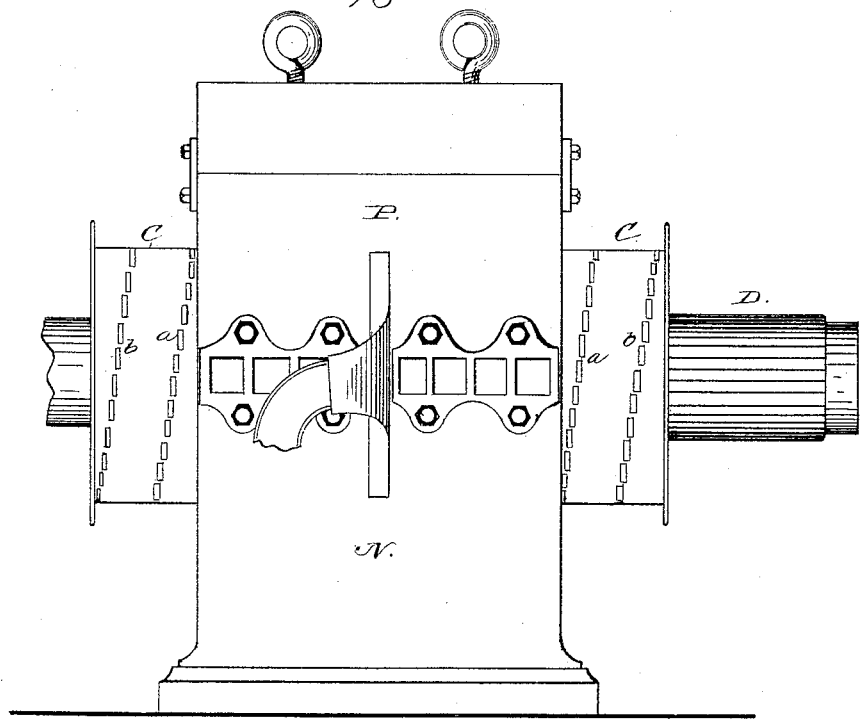

In Fig. 3, P N represent the polar extensions of the field-magnet of the machine, outside of which are the copper disks C, having the double spiral line of ears $a$ $b$.

What I claim is—

1. In an armature for dynamo or magneto electric machines consisting of bars forming the inductive coils and connecting-plates, the combination, with such plates, of the inductive bars having enlarged ends for forming connection therewith, substantially as set forth.

2. In a dynamo or magneto electric machine, the combination of the disks having a double spiral line of projecting ears with the inductive bars connected with such ears, the alternate bars being curved outwardly to avoid the first line of ears, substantially as set forth.

3. In a dynamo or magneto electric machine having cross connecting disks, the combination, with said disks, of the outside rods connecting them with the commutator, substantially as set forth.

4. In a dynamo or magneto electric machine, the combination of the inductive bars and the disks having projecting ears with the outside rods extending from alternate ears to the commutator-bars, substantially as set forth.

5. In a dynamo or magneto electric machine, the combination, with the armature-core, of the cross connecting disks located outside of the magnetic field, substantially as set forth.

6. In a dynamo or magneto electric machine, the combination, with the armature-core, of the cross connecting disks separated from the ends of such core, leaving air-spaces and removing disks from magnetic field, substantially as set forth.

7. In a dynamo or magneto electric machine, the cross connecting disks having beveled edges, in combination with intermediate insulation, substantially as set forth.

8. In a dynamo or magneto electric machine, the copper inductive bars wrapped with parchment-paper, substantially as set forth.

9. In a dynamo or magneto electric machine, the copper inductive bars having an insulation of mica and parchment-paper, substantially as set forth.

This specification signed and witnessed this 24th day of August, 1881.

THOS. A. EDISON.

Witnesses:
RICHD. N. DYER,
H. W. SEELY.